(12) United States Patent
O'Donoghue et al.

(10) Patent No.: US 8,101,544 B2
(45) Date of Patent: Jan. 24, 2012

(54) COATING COMPOSITIONS FOR MARKING SUBSTRATES

(75) Inventors: Karen O'Donoghue, Epping (GB); Jonathan Campbell, Riehen (CH)

(73) Assignee: Datalase Ltd., Widnes, Cheshire (GB)

( * ) Notice: Subject to any disclaimer, the term of this patent is extended or adjusted under 35 U.S.C. 154(b) by 965 days.

(21) Appl. No.: 11/793,499

(22) PCT Filed: Dec. 14, 2005

(86) PCT No.: PCT/EP2005/056763
§ 371 (c)(1),
(2), (4) Date: Apr. 3, 2008

(87) PCT Pub. No.: WO2006/067073
PCT Pub. Date: Jun. 29, 2006

(65) Prior Publication Data
US 2008/0207444 A1    Aug. 28, 2008

(30) Foreign Application Priority Data
Dec. 24, 2004 (GB) .................................. 0428299.2

(51) Int. Cl.
*B41M 5/333* (2006.01)
*C09D 11/00* (2006.01)
(52) U.S. Cl. ...................... 503/201; 106/31.17; 503/216
(58) Field of Classification Search .................. None
See application file for complete search history.

(56) References Cited

U.S. PATENT DOCUMENTS

| 4,680,598 A | * | 7/1987 | Obitsu et al. .................. 503/217 |
| 4,820,683 A | * | 4/1989 | Vervacke et al. ............. 503/210 |
| 6,906,735 B2 | | 6/2005 | Bhatt et al. |

FOREIGN PATENT DOCUMENTS

| CN | 1537059 A | 10/2004 |
| EP | 0319283 | 6/1989 |
| GB | 2002801 | 2/1979 |
| JP | 1232093 | 9/1989 |
| JP | 7017134 | 1/1995 |
| JP | 2004045549 | 2/2004 |
| JP | 2004160806 | 6/2004 |

* cited by examiner

*Primary Examiner* — Bruce H Hess
(74) *Attorney, Agent, or Firm* — Stoel Rives LLP

(57) ABSTRACT

The present invention provides coating compositions for marking substrates, which comprise a colour former in an amount of from 0.01 to 50%, a metal salt of a carboxylic acid in an amount of from 0.01 to 50%, a binder in an amount of from 1 to 80% and an organic solvent in an amount of from 1 to 99%, wherein each amount is by weight based on the weight of the composition. The present invention also provides a process for the preparation of the composition of the present invention, substrates coated with these compositions and a process for preparing a marked substrate using these compositions.

13 Claims, No Drawings

COATING COMPOSITIONS FOR MARKING SUBSTRATES

The present invention refers to coating compositions for marking substrates, to a process for the preparation of these compositions, to substrates coated with these compositions, to a process for preparing marked substrates using these compositions and to marked substrates.

Packaging usually needs to be marked with visible information such as logos, bar codes, expiry dates or batch numbers. One way to achieve this is by coating the packaging with a composition comprising a colour former and a colour developer, which upon treatment with energy such as heat react to form a visible colour.

U.S. Pat. No. 4,820,683 describes coating compositions, which are dispersions comprising a colour former, a metal carboxylate, for example a zinc biscarboxylate, an additional acidic colour developer such as a phenolic compound, a metal stearate, a binder and water as solvent. The compositions were coated on a substrate, dried and an image was produced upon treatment with heat.

WO 02/074548 describes coating compositions comprising an oxyanion of a multivalent metal, for example ammonium octamolybdate (AOM), a binder, which is typically polymeric, and a solvent such as water or ethanol. These compositions were coated on a substrate, for example cartonboard, dried and exposed to an IR laser to produce an image.

WO 2004/043704 describes coating compositions comprising an amine compound of molybdenum, tungsten or vanadium, an organic solvent and optionally a polymeric binder. An example of an "amine molybdate" is bis(2-ethylhexyl)amine octamolybdate. The compositions were coated on substrates such as polyethylene terephthalate film, aluminium foil or polypropylene packaging film, dried and exposed to an IR laser or thermal printer to produce an image.

A disadvantage of the coating compositions described in U.S. Pat. No. 4,820,683 and WO 02/074548 is that only opaque coatings are obtainable. A disadvantage of the coating compositions described in WO 02/074548 and WO 2004/043704 is that expensive molybdenum compounds are used. A further disadvantage of the coating composition of WO 2004/043704 is that the preparation of the "amine molybdate" is very inconvenient as it involves the formation of a tarry material, part of which adheres to the vessel walls.

It is an object of the present invention to provide translucent to transparent coating compositions, which yield images of high intensity and brightness. At the same time the coating compositions shall not require expensive metal compounds, which are inconvenient to prepare, and shall not be prone to colouration before treatment with energy.

This object is solved by the composition according to claim 1, the substrate according to claims 7 and 10 and the processes according to claims 6, 8 and 9.

The compositions of the present invention comprise a colour former in an amount from 0.01 to 50%, a metal salt of a carboxylic acid in an amount from 0.01 to 50%, a binder in an amount from 1 to 80% and an organic solvent in an amount from 1 to 99%, wherein each amount is by weight based on the weight of the composition.

Preferably, the composition comprises the colour former in an amount from 0.1 to 30%, the metal salt of a carboxylic acid in an amount from 0.1 to 30%, the binder in an amount from 3 to 60% and the organic solvent in an amount from 20 to 95%, wherein each amount is by weight based on the weight of the composition.

More preferably, the composition comprises the colour former in an amount from 1 to 20%, the metal salt of a carboxylic acid in an amount from 1 to 20%, the binder in an amount from 5 to 30% and the organic solvent in an amount from 50 to 90%, wherein each amount is by weight based on the weight of the composition.

Most preferably, the composition comprises the colour former in an amount from 1 to 10%, the metal salt of a carboxylic acid in an amount from 1 to 10%, the binder in an amount of from 7 to 14% and the organic solvent in an amount from 75 to 85%, wherein each amount is by weight based on the weight of the composition.

Preferably, the total amount of the four components, colour former, metal salt of a carboxylic acid, binder and organic solvent, is 50 to 100%, more preferably 80 to 100%, even more preferably 95 to 100%, most preferably 100%, by weight based on the weight of the composition.

The carboxylic acid can be a carboxylic acid of formula

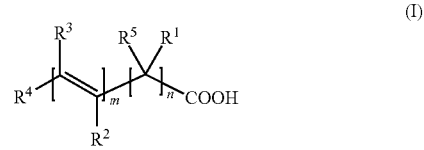

(I)

or a mixture of carboxylic acids of formula (I)
in which
n is 0, 1, 2, 3, 4, 5, 6, 7, 8, 9, 10, 11, 12, 13 or 14,
m is 0, 1, 2, 3 or 4,
$R^1$ and $R^5$ are the same or different and can be hydrogen, hydroxy, $C_{1-12}$-alkyl, carboxy, $C_{1-4}$-alkoxycarbonyl, carbamoyl, $C_{1-4}$-alkylaminocarbonyl, acyl, amino, ($C_{1-4}$alkyl)-CO—NH or ureido,
$R^2$ and $R^3$ are the same or different and can be hydrogen, $C_{1-4}$-alkyl or ($C_{1-4}$-alkyl)-CO—NH, $R^4$ is hydrogen, $C_{1-12}$-alkyl, carboxy, $C_{1-4}$-alkoxycarbonyl, carbamoyl, $C_{1-4}$-alkylaminocarbonyl, acyl, amino, ($C_{1-4}$-alkyl)-CO—NH, ureido, phenyl, 2-, 3-, or 4-pyridyl, or 1-, 2- or 3-naphthyl, whereby phenyl, pyridyl or naphthyl can be unsubstituted or mono-, di- or trisubstituted with $C_{1-4}$-alkyl, phenyl, $C_{1-4}$-alkoxy, hydroxy, di($C_{1-4}$-alkyl)amino or halogen.

$C_{1-4}$-Alkoxy can be methoxy, ethoxy, propoxy, isopropoxy, butoxy, isobutoxy, sec-butoxy and tert-butoxy. $C_{1-12}$-Alkyl can be methyl, ethyl, propyl, isopropyl, butyl, sec-butyl, tert-butyl, pentyl, hexyl, heptyl, octyl, nonyl, decyl, undecyl and dodecyl. Examples of acyl are acetyl and benzoyl. Halogen can be chlorine, fluorine or bromine.

In preferred carboxylic acids (I)
n is an integer from 0 to 9,
m is an integer from 0 to 3
$R^1$ and $R^5$ are the same or different and are hydrogen, hydroxy, $C_{1-4}$-alkyl, carboxy, $C_{1-4}$-alkoxycarbonyl, carbamoyl, $C_{1-4}$-alkylaminocarbonyl, acyl, amino, ($C_{1-4}$-alkyl)-CO—NH or ureido,
$R^2$ and $R^3$ are the same or different and are hydrogen, $C_{1-4}$-alkyl or ($C_{1-4}$-alkyl)-CO—NH, $R^4$ is hydrogen, $C_{1-7}$-alkyl, carboxy, $C_{1-4}$-alkoxycarbonyl, carbamoyl, $C_{1-4}$-alkylaminocarbonyl, acyl, amino, ($C_{1-4}$-alkyl)-CO—NH, ureido, phenyl, 2-, 3-, or 4-pyridyl, or 1-, 2- or 3-naphthyl, whereby phenyl, pyridyl or naphthyl can be unsubstituted or mono-, di- or trisubstituted with $C_{1-4}$-alkyl, phenyl, $C_{1-4}$-alkoxy, hydroxy, di($C_{1-4}$-alkyl)amino or halogen.

$C_{1-4}$-Alkyl can be methyl, ethyl, propyl, isopropyl, butyl, isobutyl, sec-butyl and tert-butyl. $C_{1-7}$-Alkyl can be methyl, ethyl, propyl, isopropyl, butyl, isobutyl, sec-butyl, tert-butyl, pentyl, hexyl or heptyl.

In more preferred carboxylic acids (I)
n is an integer from 0 to 8,
m is 0, 1 or 2,
$R^1$ is hydrogen or hydroxy,
$R^5$ is hydrogen,
$R^2$ and $R^3$ are the same or different and are hydrogen or acetamido,
$R^4$ is hydrogen, $C_{1-6}$-alkyl, carboxy, carbamoyl, benzoyl, phenyl or 1-, 2- or 3-naphthyl, whereby phenyl can be unsubstituted or mono-, di- or trisubstituted with $C_{1-4}$-alkyl, phenyl, $C_{1-4}$-alkoxy, hydroxy, di($C_{1-4}$-alkyl)amino or halogen; and whereby naphthyl can be unsubstituted or substituted with hydroxy.

$C_{1-6}$-Alkyl can be methyl, ethyl, propyl, isopropyl, butyl, isobutyl, sec-butyl, tert-butyl, pentyl or hexyl.

Examples of more preferred carboxylic acids are phenylacetic acid, p-tolylacetic acid, 4-bi-phenylacetic acid, mandelic acid, trans-styrylacetic acid, sorbic acid, α-acetamidocinnamic acid, 4-methylcinnamic acid, 4-methoxyphenylacetic acid, undecylenic acid, succinic acid, ferulic acid, muconic acid, lactic acid, trans-2-pentenoic acid, trans-3-hexenoic acid, trans-2-octenoic acid, trans-cinnamic acid, trans-3,4-dimethoxycinnamic acid, trans-3,4,5-trimethoxycinnamic acid, hydrocinnamic acid, 3,4,5-trimerthoxyhydrocinnamic acid, 3,5-di-tert-butylsalicylic acid, 4-(dimethylamino)benzoic acid, 4-phenylbutyric acid, trans-2-chloro-cinnamic acid, 3,4-dimethoxyphenyl acetic acid, 3-hydroxy-2-naphthoic acid, benzoic acid, 1-hydroxy-2-naphthoic acid, 1-naphthylacetic acid, 3-benzoylpropionic acid and 1-naphthoic acid or mixtures thereof.

In even more preferred carboxylic acids I
n is an integer from 0 to 8,
m is 0, 1 or 2, with the proviso that n and m are not 0 at the same time,
$R^1$ is hydrogen or hydroxy,
$R^5$ is hydrogen,
$R^2$ and $R^3$ are the same or different are hydrogen or acetamido,
$R^4$ is hydrogen, methyl, carboxy, carbamoyl or phenyl, whereby phenyl can be unsubstituted or substituted with methyl, phenyl, methoxy or hydroxy.

Examples of even more preferred carboxylic acids are phenylacetic acid, p-tolylacetic acid, 4-biphenylacetic acid, mandelic acid, trans-styrylacetic acid, sorbic acid, α-acetamidocinnamic acid, 4-methylcinnamic acid, 4-methoxyphenylacetic acid, undecylenic acid, succinic acid, ferulic acid, muconic acid and lactic acid or mixtures thereof.

The most preferred carboxylic acids are phenylacetic acid, p-tolylacetic acid, 4-biphenylacetic acid, mandelic acid, trans-styrylacetic acid, sorbic acid, α-acetamidocinnamic acid and 4-methylcinnamic acid or mixtures thereof.

The metal can be an alkaline earth metal, a transition metal or a metal from the main groups III and IV. Preferably, it is selected from the group consisting of magnesium, calcium, strontium, titanium, vanadium, chromium, molybdenum, manganese, iron, cobalt, nickel, copper, zinc, aluminium and tin. More preferably, it is selected from the group consisting of calcium, manganese, cobalt, nickel, copper, zinc, aluminium and tin. Most preferably, the metal is zinc.

The metal salt of the carboxylic acid can be formed by reacting an inorganic metal salt such as metal halide or sulfate with an alkali metal salt of the carboxylic acid in water.

The colour former can be any suitable colour former such as a phthalide, a fluoran, a triarylmethane, a benzoxazine, a quinazoline, a spiropyran, a quinone, a thiazine or an oxazine or mixtures thereof.

Examples of phthalides are crystal violet lactone (3,3-bis (p-dimethylaminophenyl)-6-dimethylaminophtalide), 3,3-bis(p-dimethylaminophenyl)phthalide, 3,3-bis(1-ethyl-2-methylindol-3-yl)phthalide, 3,3-bis(1-octyl-2-methylindol-3-yl)phthalide, 3-(4-diethylaminophenyl)-3-(1-ethyl-2-methylindol-3-yl)-phthalide, 7-(N-ethyl-N-isopentylamino)-3-methyl-1-phenyl-spiro[4H-chromeno[2,3-c]pyrazole-4(1H)-3'phthalide, 3,6,6'-tris(dimethylamino)spiro-[fluorene-9,3'-phthalide], 3,6,6'-tris(diethylamino)spiro[fluorene-9,3'-phthalide], 3,3-bis-[2-(p-dimethylaminophenyl)-2-(p-methoxyphenyl)ethenyl-4,5,6,7-tetrabromophthalide, 3,3-bis-[2-(p-dimethylaminophenyl)-2-(p-methoxyphenyl) ethenyl-4,5,6,7-tetrachlorophthalide, 3,3-bis[1,-bis(4-pyrrolidinophenyl)ethylene-2-yl]-4,5,6,7-tetrabromophthalide, 3,3-bis-[1-(4-methoxyphenyl)-1-(4-pyrridinophenyl)ethylene-2-yl]-4,5,6,7-tetrachlorophthalide, 3-(4-diethylamino-2-ethoxyphenyl)-3-(1-ethyl-2-methylindol-3-yl)-4-azaphthalide, 3-(4-diethylamino-2-ethoxyphenyl)-3-(1-octyl-2-methylindol-3-yl)-4-azaphthalide and 3-(4-cyclo-hexylethylamino-2-methoxyphenyl)-3-(1-ethyl-2-methylindol-3-yl)-4-azaphthalide The phthalides can be prepared by methods known in the art, for example crystal violet lactone can be prepared as described in GB 1,347,467, and 3,3-bis(1-ethyl-2-methylindol-3-yl)phthalide can be prepared as described in GB 1,389,716.

Examples of fluorans are are 3-di(ethyl)amino-6-methyl-7-(tert-butoxycarbonyl)anilinofluoran, 3-diethylamino-7-dibenzylaminofluoran, 3-dibutylamino-7-dibenzylaminofluoran, 3-diethylamino-6-methyl-7-(dibenzylamino)fluoran, 3-diethylamino-6-methylfluoran, 3-diethylamino-6-chloro-7-methylfluoran, 3-diethylamino-6-methyl-7-chlorofluoran, 3-diethylamino-7-tert-butylfluoran, 3-diethylamino-7-carboxyethylfluoran, 3-diethylamino-7-methylfluoran, 3-diethylamino-6,8-dimethylfluoran, 3-diethylamino-7-chlorofluoran, 3-dibutylamino-6-methylfluoran, 3-cyclohexylamino-6-chlorofluoran, 3-diethylamino-benzo[a]fluoran, 3-diethylamino-benzo[c]fluoran, 3-dimethylamino-6-methyl-7-anilinofluoran, 3-diethylamino-6-methyl-7-anilinofluoran, 3-diethylamino-6-methyl-7-(2,4-dimethylanilino)fluoran, 3-diethylamino-6-methyl-7-(3-trifluoromethylanilino)fluoran, 3-diethylamino-6-methyl-7-(2-chloroanilino)-fluoran, 3-diethylamino-6-methyl-7-(p-chloroanilino)fluoran, 3-diethylamino-6-methyl-7-(2-fluoroanilino)fluoran, 3-diethylamino-6-methyl-7-(p-octylanilino)fluoran, 3-diethylamino-7-(p-octylanilino) fluoran, 3-diethylamino-6-methyl-7-(p-methylanilino) fluoran, 3-diethylamino-6-ethoxyethyl-7-anilinofluoran, 3-diethylamino-6-methyl-7-(3-methylanilino)fluoran, 3-diethylamino-7-(3-trifluoromethylanilino)fluoran, 3-diethylamino-7-(2-chloroanilino)fluoran, 3-diethylamino-7-(2-fluoroanilino)fluoran, 3-diethylamino-6-chloro-7-anilinofluoran, 3-dibutylamino-6-methyl-7-anilinofluoran, 3-dibutylamino-6-methyl-7-(2,4-dimethylanilino)fluoran, 3-dibutylamino-6-methyl-7-(2-chloroanilino)fluoran, 3-dibutylamino-6-methyl-7-(4-chloroanilino)-fluoran, 3-dibutylamino-6-methyl-7-(2-fluoroanilino)fluoran, 3-dibutylamino-6-methyl-7-(3-trifluoromethylanilino)fluoran, 3-dibutylamino-6-ethoxyethyl-7-anilinofluoran, 3-dibutylamino-6-chloro-anilinofluoran, 3-dibutylamino-6-methyl-7-(4-methylanilino)fluoran, 3-dibutylamino-7-(2-chloroanilino)fluoran, 3-dibutylamino-7-(2-fluoroanilino) fluoran, 3-dipentylamino-6-methyl-7-anilinofluoran, 3-dipentylamino-6-methyl-7-(4-2-chloroanilino)fluoran, 3-dipentylamino-7-(3-trifluoromethylanilino)fluoran, 3-dipentylamino-6-chloro-7-anilinofluoran, 3-dipentylamino-7-

(4-chloroanilino)fluoran, 3-pyrrolidino-6-methyl-7-anilinofluoran, 3-piperidino-6-methyl-7-anilinofluoran, 3-(N-methyl-N-propylamino)-6-methyl-7-anilinofluoran, 3-(N-methyl-N-cyclohexylamino)-6-methyl-7-anilinofluoran, 3-(N-ethyl-N-cyclohexylamino)-6-methyl-7-anilinofluoran, 3-(N-ethyl-N-hexylamino)-7-anilinofluoran, 3-(N-ethyl-p-toluidino)-amino-6-methyl-7-anilinofluoran, 3-(N-ethyl-p-toluidino)amino-7-methylfluoran, 3-(N-ethyl-N-isoamylamino)-6-methyl-7-anilinofluoran, 3-(N-ethyl-N-isoamylamino)-7-(2-chloroanilino)-fluoran, 3-(N-ethyl-N-isoamylamino)-6-chloro-7-anilinofluoran, 3-(N-ethyl-N-tetrahydrofurylamino)-6-methyl-7-anilinofluoran, 3-(N-ethyl-N-isobutylamino)-6-methyl-7-anilinofluoran, 3-(N-butyl-N-isoamylamino)-6-methyl-7-anilinofluoran, 3-(N-isopropyl-N-3-pentylamino)-6-methyl-7-anilinofluoran, 3-(N-ethyl-N-ethoxypropylamino)-6-methyl-7-anilinofluoran, 2-methyl-6-p-(p-dimethylaminophenyl)aminoanilinofluoran, 2-methoxy-6-p-(p-dimethylaminophenyl)aminoanilinofluoran, 2-chloro-3-methyl-6-p-(p-phenylaminophenyl)amino-anilinofluoran, 2-diethylamino-6-p-(p-dimethylaminophenyl)aminoanilinofluoran, 2-phenyl-6-methyl-6-p-(p-phenylaminophenyl)aminoanilinofluoran, 2-benzyl-6-p-(p-phenylaminophenyl)aminoanilinofluoran, 3-methyl-6-p-(p-dimethylaminophenyl)aminoanilinofluoran, 3-diethylamino-6-p-(p-diethylaminophenyl) aminoanilinofluoran, 3-diethylamino-6-p-(p-dibutylaminophenyl)aminoanilinofluoran and 2,4-dimethyl-6-[(4-dimethylamino)anilino]fluoran.

The fluorans can be prepared by methods known in the art, for example 3-diethylamino-7-dibenzylaminofluoran, 3-diethylamino-7-tert-butylfluoran, 3-diethylamino-6-methyl-7-anilinofluoran and 3-diethylamino-6-methyl-7-(2,4-dimethylanilino)fluoran and can be prepared as described in U.S. Pat. No. 5,166,350 A, 3-diethylamino-6-methyl-7-(3-methylanilino)fluoran can be prepared as described in EP 0 546 577 A1, 3-diethylamino-6-chloro-7-anilinofluoran can be prepared as described in DE 2130845, 3-pyrrolidino-6-methyl-7-anilinofluoran and 3-piperidino-6-methyl-7-anilinofluoran can be prepared as described in U.S. Pat. No. 3,959,571 A, 3-(N-ethyl-N-isoamylamino)-6-methyl-7-anilinofluoran can be prepared as described in GB 2 002 801 A, and 3-(N-methyl-N-propylamino)-6-methyl-7-anilinofluoran can be prepared as described in GB 2 154 597 A.

Examples of benzoxazines are 2-phenyl-4-(4-diethylaminophenyl)-4-(4-methoxyphenyl)-6-methyl-7-dimethylamino-3,1-benzoxazine, which can be prepared as described in EP 0 187 329 A1, and 2-phenyl-4-(4-diethylaminophenyl)-4-(4-methoxyphenyl) 8-methyl-7-dimethylamino-3,1-benzoxazine.

An example of a quinazoline is 4,4'-[1-methylethylidene) bis(4,1-phenyleneoxy-4,2-quina-zolinediyl)]bis[N,N-diethylbenzeneamine]. An example of a triarylmethane is bis(N-methyidi-phenylamine)-4-yl-(N-butylcarbazole)-3-yl-methane, which can be prepared as described in GB 1,548,059.

Examples of spiropyrans are 1',3',3'-trimethylspiro[2H-1-benzopyran-2,2'-indoline], 1,3,3-trimethylspiro[indoline-2,3'-[3H]naphth[2,1-b][1,4]oxazine] and 1',3',3'-trimethylspiro-[2H-1-benzothiopyran-2,2'-indoline].

An example of a quinone is hematoxyline. An example of an oxazine is 3,7-bis(dimethylamino)-10-benzoylphenoxazine. An example of a thiazine is 3,7-bis(dimethylamino)-10-benzoylphenothiazine.

Preferably, the colour former is a phthalide or a fluoran or mixtures thereof.

More preferably, the colour former is crystal violet lactone or 3,3-bis(p-dimethylaminophenyl)-6-dimethylaminophthalide as sold for example under the tradename Ciba® Pergascript® Blue I-2RN, 3,3-bis(1-octyl-2-methylindol-3-yl)phthalide as sold for example under the tradename Ciba® Pergascript® Red I-6B or 3-diethylamino-7-(ethoxycarbonyl)-fluoran as sold for example under the tradename Ciba® Pergascript® Orange I-G.

The binder can be any suitable binder. Preferably, the binder is a polymeric binder. Examples of polymeric binders are acrylic polymers, styrene polymers and hydrogenated products thereof, vinyl polymers, polyolefins and hydrogenated or epoxidized products thereof, aldehyde polymers, epoxide polymers, polyamides, polyesters, polyurethanes, sulfone-based polymers and natural polymers and derivatives thereof. The polymeric binder can also be a mixture of polymeric binders.

Acrylic polymers are polymers formed from at least one acrylic monomer or from at least one acrylic monomer and at least one styrene monomer, vinyl monomer, olefin monomer and/or maleic monomer.

Examples of acrylic monomers are acrylic acid or salts thereof, acrylamide, acrylonitrile, $C_{1-6}$-alkyl acrylates such as ethyl acrylate, butyl acrylate or hexyl acrylate, di($C_{1-4}$-alkyl-amino)$C_{1-6}$-alkyl acrylates such as dimethylaminoethyl acrylate or diethylaminoethyl acrylate and $C_{1-4}$-alkyl halide adducts thereof such as dimethylaminoethyl acrylate methyl chloride, amides formed from di($C_{1-4}$-alkylamino) $C_{1-6}$-alkylamines and acrylic acid and $C_{1-4}$-alkyl halide adducts thereof, methacrylic acid or salts thereof, methacrylamide, methacrylonitrile, $C_{1-6}$-alkyl methacrylates such as methyl methacrylate or ethyl methacrylate, di($C_{1-4}$-alkyl-amino)$C_{1-6}$-alkyl methacrylates and $C_{1-4}$-alkyl halide adducts thereof, amides formed from di($C_{1-4}$-alkylamino) $C_{1-6}$-alkylamines and methacrylic acid and $C_{1-4}$-alkyl halide adducts thereof and crosslinker such as N,N'-methylenebisacrylamide.

Examples of styrene monomers are styrene, 4-methylstyrene and 4-vinylbiphenyl. Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluroethylene. Examples of maleic monomers are maleic acid, maleic anhydride and maleimide.

Examples of acrylic polymers are poly(methyl methacrylate), poly(butyl methacrylate) and styrene acrylic polymers.

Styrene polymers are polymers formed from at least one styrene monomer and at least one vinyl monomer, olefin monomer and/or maleic monomer. Examples of styrene monomers, vinyl monomers, olefin monomers and maleic monomers are given above. Examples of styrene polymers are styrene butadiene styrene block polymers, styrene ethylene butadiene block polymers, styrene ethylene propylene styrene block polymers.

Vinyl polymers are polymers formed from at least one vinyl monomer or from at least one vinyl monomer and at least one olefin monomer or maleic monomer. Examples of vinyl monomers, olefin monomers and maleic monomers are given above. Examples of vinyl polymers are polyvinyl chloride and polyvinylalcohol.

Polyolefins are polymers formed from at least one olefin monomer. Examples of olefin monomers are given above. Examples of polyolefins are polyethylene, polypropylene and polybutadiene.

Aldehyde polymers are polymers formed from at least one aldehyde monomer or polymer and at least one alcohol monomer or polymer, amine monomer or polymer and/or urea monomer or polymer. Examples of aldehyde monomers are formaldehyde, furfural and butyral. Examples of alcohol monomers are phenol, cresol, resorcinol and xylenol. An example of polyalcohol is polyvinyl alcohol. Examples of amine monomers are aniline and melamine. Examples of urea monomers are urea, thiurea and dicyandiamide.

An example of an aldehyde polymer is polyvinyl butyral formed from butyral and polyvinylalcohol.

Epoxide polymers are polymers formed from at least one epoxide monomer and at least one alcohol monomer and/or amine monomer. Examples of epoxide monomers are epichlorhydrine and glycidol. Examples of alcohol monomers are phenol, cresol, resorcinol, xylenol, bisphenol A and glycol. An example of epoxide polymer is phenoxy resin, which is formed from epichlorihydrin and bisphenol A.

Polyamides are polymers formed from at least one monomer having an amide group or an amino as well as a carboxy group or from at least one monomer having two amino groups and at least one monomer having two carboxy groups. An example of a monomer having an amide group is caprolactam. An example of a diamine is 1,6-diaminohexane. Examples of dicarboxylic acids are adipic acid, terephthalic acid, isophthalic acid and 1,4-naphthalene-dicarboxylic acid. Examples of polyamides are poyhexamethylene adipamide and polycaprolactam.

Polyesters polymers formed from at least one monomer having an hydroxy as well as a carboxy group or from at least one monomer having two hydroxy groups and at least one monomer having two carboxy groups or a lactone group. An example of a monomer having a hydroxy as well as a carboxy group is adipic acid. An example of a diol is ethylene glycol. An example of a monomer having a lactone group is carprolactone. Examples of dicarboxylic acids are terephthalic acid, isophthalic acid and 1,4-naphthalenedicarboxylic acid. An examples of polyesters is polyethylene terephthalate. So-called alkyd resins are also regarded to belong to polyester polymers.

Polyurethane are polymers formed from at least one diisocyanate monomer and at least one polyol monomer and/or polyamine monomer. Examples of diisocyanate monomers are hexamethylene diisocyanate, toluene diisiocyanate and diphenylmethane diiscocyanate.

Examples of sulfone-based polymers are polyarylsulfone, polyethersulfone, polyphenyl-sulfone and polysulfone. Polysulfone is a polymer formed from 4,4-dichlorodiphenyl sulfone and bisphenol A.

Natural polymers can be a cellulose, natural rubber or gelatin. Examples of cellulose derivatives are ethyl cellulose, hydroxypropyl cellulose, nitrocellulose, cellulose acetate and cellulose propionate.

The polymeric binders are known in the art and can be produced by known methods. The polymeric binder can be also produced in situ by UV radiation of a composition comprising monomers, capable of radical polymerisation, and a UV sensitive initiator.

Preferred polymeric binders are acrylic polymers, vinyl polymers, aldehyde polymers, epoxide polymers, polyamides, polyesters and natural polymers and derivatives thereof. More preferred polymeric binders acrylic polymers, vinyl polymers, natural polymers and derivatives thereof.

Even more preferred polymeric binders are poly(methyl methacrylate), poly(butyl methacrylate), polyvinyl alcohol and cellulose.

The most preferred polymeric binder is poly(methyl methacrylate).

The organic solvent can be any suitable organic solvent or mixture of organic solvents. Preferably, it is a polar organic solvent or a mixture of polar organic solvents.

Examples of polar organic solvents are $C_{1-4}$-alkanols, $C_{1-4}$-polyols, $C_{1-4}$-alkyl $C_{1-4}$-alkanoates, $C_{3-6}$-ketones, $C_{4-6}$-ethers, $C_{2-3}$-nitriles, nitromethane, dimethylsulfoxide, dimethylformamide, dimethylacetamide, N-methyl pyrolidone and sulfolane, whereby $C_{1-4}$-alkanols, $C_{1-4}$-polyols and $C_{1-4}$-alkyl $C_{1-4}$-alkanoates may be substituted with $C_{1-4}$-alkoxy.

Examples of $C_{1-4}$-alkanols are methanol, ethanol, propanol, isopropanol or butanol, iso-butanol, sec-butanol and tert-butanol. Examples of a $C_{1-4}$-alkoxy derivatives thereof are 2-ethoxyethanol and 1-methoxy-2-propanol. Examples of $C_{1-4}$-polyols are glycol and glycerol. Examples of $C_{1-4}$-alkyl $C_{1-4}$-alkanoates are ethyl acetate, butyl acetate, ethyl propionate and ethyl butanoate. Examples of $C_{1-4}$-alkoxy derivatives thereof are 2-ethoxyethyl acetate and 2-methoxyethyl acetate. Examples of $C_{3-6}$-ketones are acetone and methyl ethyl ketone. Examples of $C_{4-6}$-ethers are dimethoxyethane, diisopropylethyl and tetrahydrofurane. An example of a $C_{2-3}$-nitrile is acetonitrile.

More preferably, the organic solvent is a polar organic solvent or a mixture of polar organic solvents selected from the group consisting of $C_{1-4}$-alkanols, $C_{1-4}$-alkyl $C_{1-4}$-alkanoates and $C_{3-6}$-ketones. Most preferably, the organic solvent is a $C_{3-6}$-ketone or a mixture of $C_{3-6}$-ketones.

The composition of the present invention can also comprise water, but preferably, no water is present.

The composition of the present invention can additionally comprise any other compound suitable for improving the performance such as IR absorbers, UV absorbers, antioxidants, pigments, stabilizers and taggants. Taggants are various substances added to a product to indicate its source of manufacture. The amount of the sum of these compounds can be of from 0.01 to 30% by weight based on the weight of the composition. Preferably, it is from 0.1 to 10%, and more preferably, it is from 1 to 5% by weight based on the weight of the composition.

An IR absorber can be any compound, which converts IR light into heat. Preferred IR absorbers have an absorption maximum at 1064 nm or 10600 nm. An example of a UV absorber is 2-hydroxy-4-methoxybenzophenone.

Pigments can be added for enhanced contrast between unimaged and imaged areas or as a security feature.

Examples of pigments which can be added for enhanced contrast between unimaged and imaged area are titanium dioxide, calcium carbonate, kaolin, calcined kaolin, aluminium hydroxide, talc, zinc oxide, amorphous silica, barium sulfate, polystyrene resin, urea-formaldehyde resin, hollow plastic pigment and mixtures thereof.

Examples of pigments which can be added as a security feature are fluorescent pigments or magnetic pigments.

The composition can also comprise further colour developer in addition to the metal salt of the carboxylic acid. Preferably, additional colour developers are used which do not cause colouration of the coating composition before the treatment with energy. More preferably, no phenolic compound is applied as additional colour developer. Examples of phenolic compounds are 2,2-bis(4-hydroxyphenyl)-4-methylpentane, 4,4'-isopropylidenediphenol (Bisphenol A) and bis(3-allyl-4-hydroxyphenyl)sulfone and benzyl-p-hydroxy benzoate.

The composition of the present invention can be a solution or dispersion such as an emulsion or suspension.

Depending on the desired application, the composition of the present invention can be used to obtain either transparent or opaque coatings. Preferably, transparent coatings are obtained.

The coatings formed by the coating compositions of the present invention can be coated with a laminate layer or overprint varnish. If the material of the laminate layer or the overprint varnish is selected so that it does not absorb at the wavelength of the imaging laser then the laser sensitive coating can be imaged through the laminate layer without damaging or marking the laminate. Also the laminate or overprint varnish is ideally chosen that it does not result in colouration of the coating before the energy treatment.

Examples of compositions of the present invention which yield transparent coatings are compositions comprising 3.1% by weight crystal violet lactone based on the weight of the composition as colour former, 3.1% by weight either zinc phenylacetate, zinc p-tolylacetate, zinc 4-biphenylacetate, zinc trans-styrylacetate, zinc sorbate, zinc α-acetamidocinnate, zinc 4-methylcinnamate or zinc mandelate based on the weight of the composition as metal salt of a carboxylic acid, 10.6% by weight poly(methyl methacrylate) as binder based on the weight of the composition as binder and 26.7% by weight acetone based on the weight of the composition and 54.7% by weight methyl ethyl ketone based on the weight of the composition as mixture of organic solvents.

Also part of the invention is a process for preparing the composition of the present invention comprising the step of mixing the metal carboxylate, the colour developer, the binder and the organic solvent. Preferably, the process comprises the steps of I) mixing the metal carboxylate and the organic solvent and ii) adding the colour former, the polymeric binder and optional additional compounds such as IR or UV absorbers, stabilizers etc, and iii) optionally diluting the composition to the desired concentration.

Another aspect of the invention is a substrate coated with the coating composition of the present invention.

The substrate can be a sheet or any other three dimensional object and it can be transparent or opaque. The substrate can be made from paper, cardboard, metal, wood, textiles, glass, ceramics and/or polymers. Examples of polymers are polyethylene terephthalate, low density-polyethylene, polypropylene, biaxially orientated polypropylene, polyether sulfone, polyvinyl chloride polyester and polystyrene. Preferably, the substrate is made from paper, cardboard or polymer. More preferably, the substrate is a flexible polymer film made from polyethylene terephthalate, low density-polyethylene, polypropylene, biaxially orientated polypropylene, polyether sulfone or polyvinyl chloride.

The substrate can be coated with the composition of the present invention by using a standard coating application as such as a bar coater application, rotation application, spray application, curtain application, dip application, air application, knife application, blade application or roll application. The composition can also be applied to the substrate by various printing methods such as silk screen printing, gravure printing, offset printing and flexo printing. If the substrate is paper, the composition can also be applied in the size press or at the wet-end of the paper machine.

The thickness of the coating usually chosen is in the range of 0.1 to 1000 μm. Preferably, it is in the range of 1 to 500 μm. More preferably, it is in the range of 1 to 250 μm. Even more preferably, it is in the range of 1 to 150 μm.

The coating composition can be dried, for example at ambient or elevated temperature. The elevated temperature is ideally chosen to avoid premature colour formation.

Also part of the invention is a process for preparing a marked substrate, which comprises the steps of i) coating a substrate with the composition of the present invention, and ii) exposing those parts of the coated substrate, where a marking is intended, to energy in order to generate a colour marking.

The energy can be heat or any other energy, which yields a marking when applied to the substrate coated with the composition of the present invention. Examples of such energy are UV, IR, visible or microwave irradiation.

The energy can be applied to the coated substrate in any suitable way, for example heat can be applied by using a thermal printer, and UV and IR irradiation can be applied by using a UV or IR laser. Examples of IR lasers are $CO_2$ lasers, Nd:YAG lasers and IR semiconductor lasers.

Preferably, the energy is IR irradiation. More preferably, the energy is IR irradiation having a wavelength in the range of 0.78 to 1000 μm. Most preferably, the energy is IR irradiation generated by a $CO_2$ laser or a Nd:YAG laser.

Typically the exact power of the IR laser and the line speed is determined by the application and chosen to be sufficient to generate the image, for example, when the wavelength of the IR laser is 10600 nm and the diameter of the laser beam is 0.35 mm, the power is typically 0.5 to 4 W, and the line speed is typically 300 to 1000 mm/s.

Yet another aspect of the invention is the marked substrate, which is obtained by the process of the present invention.

The coating compositions of the present invention have the advantage that they can be either transparent or opaque and that they yield images of high intensity and brightness. A further advantage of the coating compositions of the present invention is that they do not require expensive metals compounds, which, in addition, are convenient to prepare and that they are not prone to colour formation before energy treatment.

EXAMPLES

Example 1

Preparation of Zinc Phenylacetate

A solution of 47% (w/w) sodium hydroxide (5.5 g) is added to slurry of phenylacetic acid (6.8 g, 0.05 mol) in water (100 mL) at 70° C. to give a clear slightly alkaline solution. A solution of zinc chloride (3.4 g, 0.025 mol) in water (50 mL) is added and a precipitate is formed immediately. The mixture is stirred at 70° C. for further 2.5 hours. The precipitate is then filtered and dried to yield 6.5 g (78%) zinc phenyl acetate as a fine white powder. IR absorption bands: 1528, 1434 and 1388 $cm^{-1}$.

Example 2

Preparation of Zinc Mandelate

A solution of 47% (w/w) sodium hydroxide (5.5 g) is added to slurry of mandelic acid (7.6 g, 0.05 mol) in water (100 mL) at 70° C. to give a clear slightly alkaline solution. A solution of zinc chloride (3.4 g, 0.025 mol) in water (50 mL) is added and a precipitate is formed immediately. The mixture is stirred at 70° C. for further 2.5 hours. The precipitate is then filtered and dried to yield 5.6 g (61%) zinc mandelate as a fine white powder. IR absorption bands: 1592, 1404 and 1361 $cm^{-1}$.

Example 3

Preparation of Zinc 4-methylcinnamate

A solution of 47% (w/w) sodium hydroxide (5.5 g) is added to slurry of 4-methylcinnamic acid (8.1 g, 0.05 mol) in water (100 mL) at 70° C. to give a clear slightly alkaline solution. A solution of zinc chloride (3.4 g, 0.025 mol) in water (50 mL) is added and a precipitate is formed immediately. The mixture is stirred at 70° C. for further 2.5 hours. The precipitate is then filtered and dried to yield 7.7 g (80%) zinc 4-methylcinnamate as a fine white powder. IR absorption bands: 1530, 1509, 1425 and 1382 cm$^{-1}$.

Example 4

Preparation of Zinc Sorbate

A solution of 47% (w/w) sodium hydroxide (5.5 g) is added to slurry of sorbic acid (5.6 g, 0.05 mol) in water (100 mL) at 70° C. to give a clear slightly alkaline solution. A solution of zinc chloride (3.4 g, 0.025 mol) in water (50 mL) is added and a precipitate is formed immediately. The mixture is stirred at 70° C. for further 2.5 hours. The precipitate is then filtered and dried to yield 5.5 g (76%) zinc sorbate as a fine white powder. IR absorption bands: 1521 and 1418 cm$^{-1}$.

Example 5

Preparation of Zinc α-acetamidocinnamate

A solution of 47% (w/w) sodium hydroxide (5.5 g) is added to slurry of α-acetamidocinnamic acid (10.3 g, 0.05 mol) in water (100 mL) at 70° C. to give a clear slightly alkaline solution. A solution of zinc chloride (3.4 g, 0.025 mol) in water (50 mL) is added and a precipitate is formed immediately. The mixture is stirred at 70° C. for further 2.5 hours. The precipitate is then filtered and dried to yield 9.4 g (80%) zinc α-acetamidocinnamate as a fine white powder. IR absorption bands: 1560, 1510, 1402 and 1353 cm$^{-1}$.

Example 6

Preparation of Zinc Trans-styrylacetate

A solution of 47% (w/w) sodium hydroxide (5.5 g) is added to slurry of trans-styrylacetic acid (8.1 g, 0.05 mol) in water (100 mL) at 70° C. to give a clear slightly alkaline solution. A solution of zinc chloride (3.4 g, 0.025 mol) in water (50 mL) is added and a precipitate is formed immediately. The mixture is stirred at 70° C. for further 2.5 hours. The precipitate is then filtered and dried to yield 7.5 g (77%) zinc trans-styrylacetate as a fine white powder. IR absorption bands: 1526, 1436 and 1385 cm$^{-1}$.

Example 7

Preparation of a Coating Composition

Zinc biscarboxylate (1.0 g) prepared as described in example 1 is stirred in acetone (8.6 g) To this mixture is added in the following order: crystal violet lactone, sold for example under the tradename Ciba® Pergascript Blue 1-2RN, (1.0 g), poly(methyl methacrylate) (3.4 g), 2-hydroxy-4-methoxybenzophenone (0.6 g) and methyl ethyl ketone (17.6 g). The coating composition is then applied by a coating bar onto plain paper, coated paper or polyethylene terephthalate film to form a translucent coating layer of 120 μm, dried at ambient temperature and imaged using a $CO_2$ laser (wavelength: 10600 nm, power: 0.5 to 4 W, diameter of laser beam: 0.35 mm, line speed: 300 to 1000 mm/s) to yield a blue mark.

Example 8

Preparation of a Coating Composition

A coating composition is prepared as described in example 7, except that a zinc biscarboxylate (1.0 g) prepared as described in example 2 is used.

Example 9

Preparation of a Coating Composition

A coating composition is prepared as described in example 7, except that a zinc biscarboxylate (1.0 g) prepared as described in example 3 is used.

Example 10

Preparation of a Coating Composition

A coating composition is prepared as described in example 7, except that a zinc biscarboxylate (1.0 g) prepared as described in example 4 is used.

Example 11

Preparation of a Coating Composition

A coating composition is prepared as described in example 7, except that a zinc biscarboxylate (1.0 g) prepared as described in example 5 is used.

Example 12

Preparation of a Coating Composition

A coating composition is prepared as described in example 7, except that a zinc biscarboxylate (1.0 g) prepared as described in example 6 is used.

Example 13

Preparation of a Coating Composition

Zinc biscarboxylate (1.0 g) prepared as described in example 2 is stirred in acetone (8.6 g) To this mixture is added in the following order: 3,3-bis(1-octyl-2-methylindol-3-yl)phthalide, sold for example under the tradename Ciba® Pergascript® Red I-6B, (0.25 g), poly(methyl methacrylate) (3.4 g), 2-hydroxy-4-methoxybenzophenone (0.6 g) and methyl ethyl ketone (17.6 g). The coating composition is then applied by a coating bar onto plain paper, coated paper or polyethylene terephthalate film to form a translucent coating layer of 120 μm, dried at ambient temperature and imaged using a $CO_2$ laser (wavelength: 10600 nm, power: 0.5 to 4 W, diameter of laser beam: 0.35 mm, line speed: 300 to 1000 mm/s) to yield a red mark.

Example 14

Preparation of a Coating Composition

Zinc biscarboxylate (1.0 g) prepared as described in example 2 is stirred in acetone (8.6 g) To this mixture is added in the following order: 3-diethylamino-7-(ethoxycarbonyl)-fluoran, sold for example under the tradename Ciba® Pergascript® Orange I-G, (0.25 g), poly(methyl methacrylate) (3.4 g), 2-hydroxy-4-methoxybenzophenone (0.6 g) and methyl ethyl ketone (17.6 g). The coating composition is then applied by a coating bar plain paper, coated paper or polyethylene terephthalate film to form a translucent coating layer of 120 μm, dried at ambient temperature and imaged using a $CO_2$ laser (wavelength: 10600 nm, power: 0.5 to 4 W, diameter of laser beam: 0.35 mm, line speed: 300 to 1000 mm/s) to yield an orange mark.

The invention claimed is:
1. A composition comprising a colour former in an amount of from 0.01 to 50%, a metal salt of a carboxylic acid in an amount of from 0.01 to 50%, a binder in an amount of from 1 to 80% and an organic solvent in an amount of from 1 to 99%, wherein each amount is by weight based on the weight of the composition, and wherein the composition is a clear solution.

2. The composition of claim 1, wherein the carboxylic acid is a carboxylic acid of formula

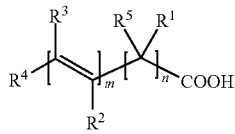

or a mixture of carboxylic acids of formula (I) in which
n is 0, 1, 2, 3, 4, 5, 6, 7, 8, 9, 10, 11, 12, 13 or 14, m is 0, 1, 2, 3 or 4,
$R^1$ and $R^5$ are the same or different and can be hydrogen, hydroxy, $C_{1-12}$-alkyl, carboxy, $C_{1-4}$-alkoxycarbonyl, carbamoyl, $C_{1-4}$-alkylaminocarbonyl, acyl, amino, ($C_{1-4}$-alkyl)-CO—NH or ureido, $R^2$ and $R^3$ are the same or different and can be hydrogen, $C_{1-4}$-alkyl or ($C_{1-4}$-alkyl)-CO—NH, $R^4$ is hydrogen, $C_{1-12}$-alkyl, carboxy, $C_{1-4}$-alkoxycarbonyl, carbamoyl, $C_{1-4}$-alkylamino-carbonyl, acyl, amino, ($C_{1-4}$-alkyl)-CO—NH, ureido, phenyl, 2-, 3-, or 4-pyridyl, or 1-, 2- or 3-naphthyl, whereby phenyl, pyridyl or naphthyl can be unsubstituted or mono-, di- or tri-substituted with $C_{1-4}$-alkyl, phenyl, $C_{1-4}$-alkoxy, hydroxy, di($C_{1-4}$-alkyl)amino or halogen.

3. The composition of claim 1, wherein the colour former is selected from the group consisting of phthalides, fluorans, triarylmethanes, benzoxazines, quinazolines, spiropyrans, quinones, thiazines, oxazines and mixtures thereof.

4. The composition of claim 1, wherein the binder is a polymeric binder.

5. The composition of claim 1, wherein the organic solvent is a polar organic solvent or a mixture of polar organic solvents.

6. A process for preparing the composition of claim 1, comprising the step of mixing the metal carboxylate, the colour developer, the binder and the organic solvent.

7. A substrate coated with the coating composition of any of claim 1.

8. The substrate of claim 7, wherein the coating is transparent.

9. A process for preparing a marked substrate comprising the steps of i) coating a substrate with the composition of any of claim 1, and ii) exposing those parts of the coated substrate, where a marking is intended, to energy in order to generate a colour marking.

10. The process of claim 9, wherein the energy is IR irradiation.

11. A marked substrate obtained by a process of claim 9.

12. The marked substrate of claim 11, wherein the coating is transparent.

13. The process of claim 9, wherein the coating is transparent.

* * * * *